United States Patent [19]
Yao et al.

[11] 3,947,291
[45] Mar. 30, 1976

[54] ELECTROCHEMICAL CELL ASSEMBLED IN DISCHARGED STATE

[75] Inventors: Neng-Ping Yao, Hinsdale; William J. Walsh, Naperville, both of Ill.

[73] Assignee: The United States of America as represented by the United States Energy Research and Development Administration, Washington, D.C.

[22] Filed: Sept. 30, 1974

[21] Appl. No.: 510,840

[52] U.S. Cl.................. 136/6 LF; 136/20; 136/155
[51] Int. Cl.²........................................ H01M 10/00
[58] Field of Search..... 136/6 LF, 6 FS, 83 R, 83 T, 136/155, 20

[56] References Cited
UNITED STATES PATENTS

| | | | |
|---|---|---|---|
| 3,488,221 | 1/1970 | Shimatake et al. | 136/6 LF X |
| 3,645,792 | 2/1972 | Hacha | 136/6 LF |
| 3,666,560 | 5/1972 | Cairns et al. | 136/6 LF |
| 3,716,409 | 2/1973 | Cairns et al. | 136/6 R |
| 3,837,918 | 9/1974 | Nakabayashi | 136/83 T X |

*Primary Examiner*—G. L. Kaplan
*Assistant Examiner*—C. F. LeFevour
*Attorney, Agent, or Firm*—Dean E. Carlson; Arthur A. Churm; Hugh W. Glenn, Jr.

[57] ABSTRACT

A secondary, electrochemical cell is assembled in a completely discharged state within a sealed containment. As assembled, the cell includes a positive electrode separated from a negative electrode by a molten salt electrolyte. The positive electrode is contained within a porous structure, permitting passage of molten electrolyte, and includes one or more layers of a metallic mesh, e.g. iron, impregnated with an intimate mixture of lithium sulfide and the electrolyte. The negative electrode is a porous plaque of aluminum metal. Prior to using the cell, an electrical charge forms lithium-aluminum alloy within the negative electrode and metal sulfide within the positive electrode.

12 Claims, 14 Drawing Figures

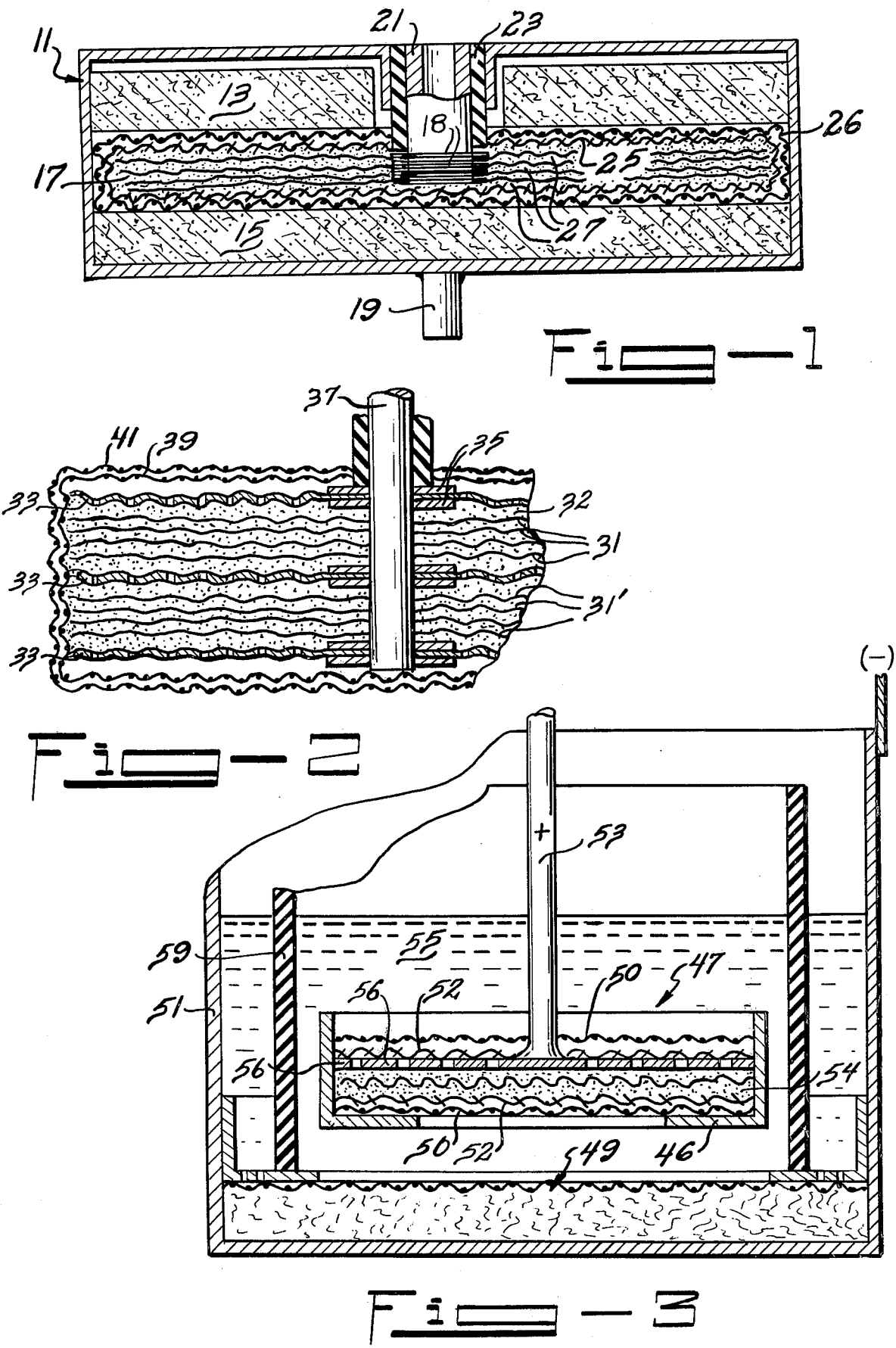

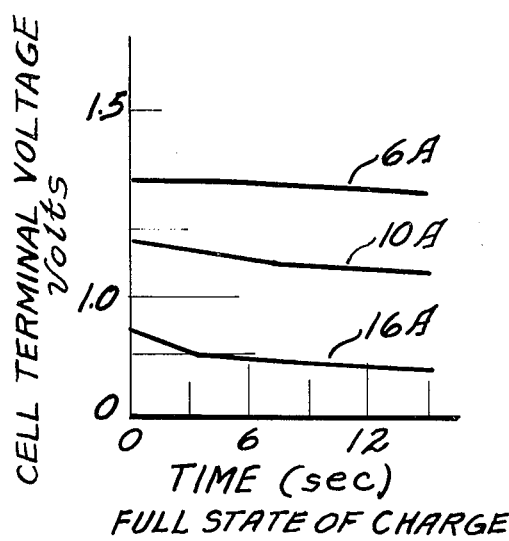
Fig-5b — FULL STATE OF CHARGE
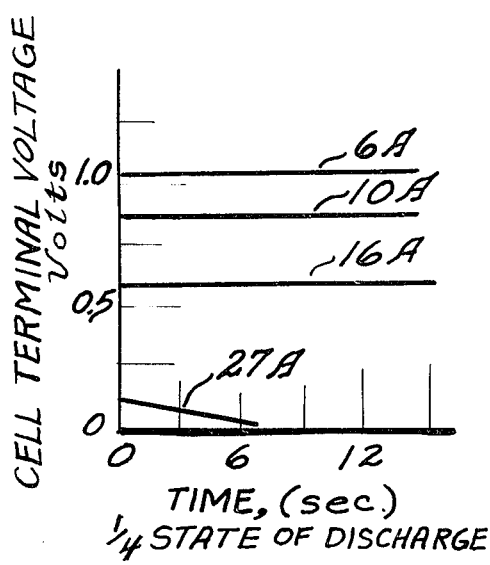
Fig-5c — 1/4 STATE OF DISCHARGE
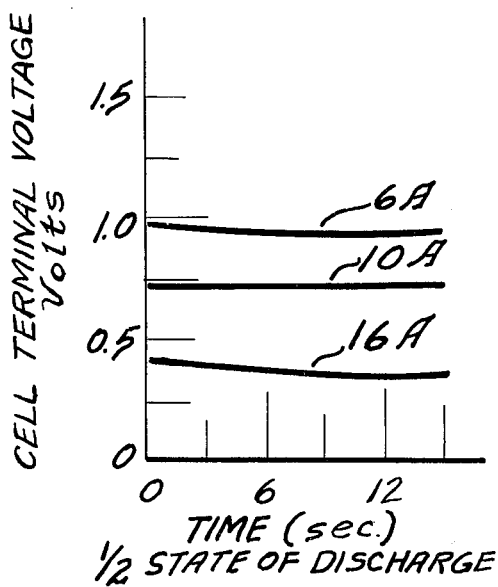
Fig-5d — 1/2 STATE OF DISCHARGE
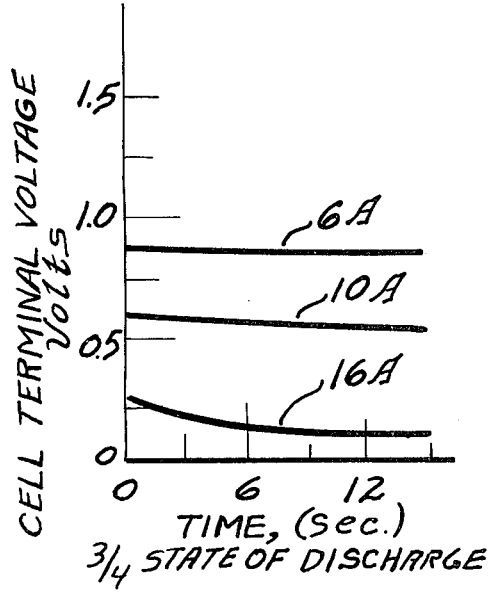
Fig-5e — 3/4 STATE OF DISCHARGE

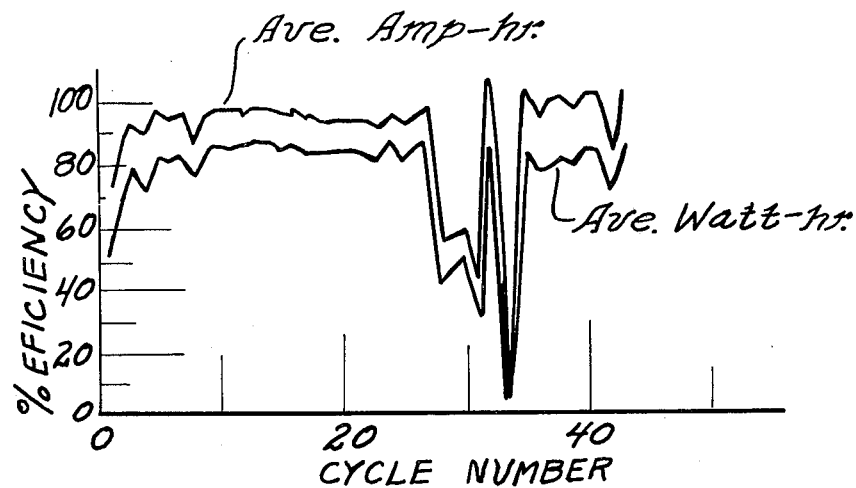
Fig—6a
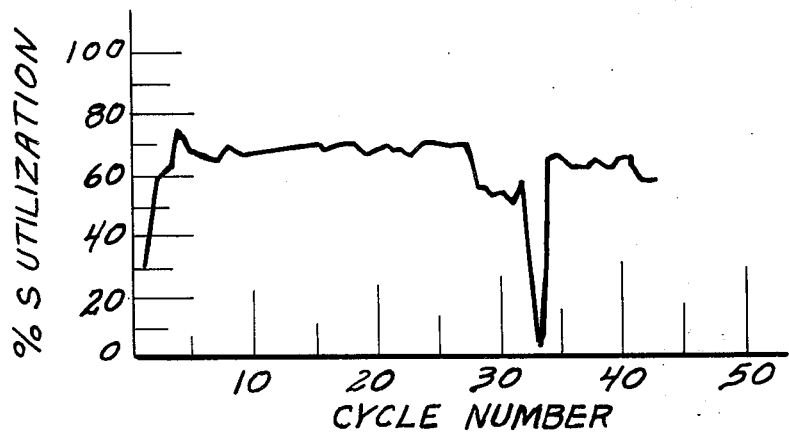
Fig—6b

ELECTROCHEMICAL CELL ASSEMBLED IN DISCHARGED STATE

CONTRACTUAL ORIGIN OF THE INVENTION

The invention described herein was made in the course of, or under, a contract with the U.S. ATOMIC ENERGY COMMISSION.

BACKGROUND OF THE INVENTION

This invention relates to high-temperature, secondary electrochemical cells and batteries of such cells that can be employed as power sources for electrical automobiles, hybrid electric vehicles or for the storage of energy generated during intervals of off-peak power consumption. It is particularly applicable to electrochemical cells that employ metal sulfides as positive electrode reactants and lithium-aluminum alloy as he negative electrode reactant.

A substantial amount of work has been done in the development of these types of electrochemical cells and their electrodes. Various type cells showing promise have employed lithium, lithium-aluminum alloy or sodium as the reactant within the negative electrode. In the positive electrode, the chalcogens, particularly sulfur and sulfur compounds, have been used. Electrolytes of molten salt generally containing the ions of negative electrode reactant are used to provide ionic conduction between the electrodes. Examples of such secondary cells and their various components are disclosed in U.S. Pat. No. 3,716,409 to Cairns et al., entitled "Cathodes for Secondary Electrochemical Power-Producing Cells," Feb. 13, 1973; U.S. Pat. No. 3,666,560 to Cairns et al., entitled "Electrochemical Power-Producing Cell,"May 30, 1972; and U.S. Pat. No. 3,488,221 to Hiroshi Shimotake et al., Jan. 6, 1970. Other cells and electrodes of these types are illustrated in U.S. Pat. No. 3,833,421 to Rubischko et al., entitled "Secondary Electrochemical Cells with a Chalcogen Cathode," Sept. 3, 1974, and U.S. Pat. No. 3,827,910 to Cairns et al., entitled "Homogeneous Cathode Mixture for Secondary Electrochemical Power-Producing Cells,"Aug. 6, 1974. Other pending patent applications showing electrochemical cells more closely related to the type described in the present application include patent application Ser. No. 416,311, entitled "Modular Electrochemical Cell," filed Nov. 15, 1973, to Walsh et al., now U.S. Pat. No. 3,887,396 and Ser. No. 434,459, entitled "Cathode for a Secondary Electrochemical Cell," to Gay et al., filed Jan. 18, 1974. Each of these patents and patent applications are assigned to the assignee of the present application.

As is discussed in the pending patent application to Gay, cited above, reductions in sulfur activity and loss can be made through use of metal sulfides as the cathode material. For instance, electrochemical cells have been proposed which employ lithium or lithium-aluminum alloy as the anode reactant along with metal sulfide such as $FeS_2$, $FeS$, $CoS_2$, $Co_3S_4$, $NiS_2$, $MoS_3$ or $Cu_2S$ as the positive electrode reactant. (Etude Thermodynamique des Generateurs a Electrode de Lithium, Entropie, No. 4, pp. 24–34, Juillet-Aout 1971, Caiola et al.) Other cathode reactants that have been considered include $Sb_2S_3$, $As_2S_2$, $As_2S_3$ and $P_4S_{10}$. Typical reactions with the above materials within a cell having a lithium or a lithium alloy anode are as follows:

$$4e^- + FeS_2 + 4Li^+ \rightarrow 2Li_2S + Fe$$

$$2e^- + FeS + 2Li^+ \rightarrow Li_2S + Fe$$

$$4e^- + CoS_2 + 4Li^+ \rightarrow 2Li_2S + Co$$

$$8e^- + Co_3S_4 + 8Li^+ \rightarrow 4Li_2S + 3Co$$

$$2e^- + NiS + 2Li^+ \rightarrow Li_2S + Ni$$

$$6e^- + MoS_3 + 6Li^+ \rightarrow 3Li_2S + Mo$$

$$2e^- + Cu_2S + 2Li^+ \rightarrow Li_2S + 2Cu.$$

Correspondingly, the reaction at the negative electrode is:

$$Li \rightarrow Li^+ + e^- \text{ or}$$

$$LiAl \rightarrow Li^+ + Al + e^-.$$

In preparing electrochemical cells of this type, various problems have been encountered. Lithium metal is most reactive and is easily contaminated by combination with moisture, oxygen or nitrogen within air. Li-Al alloys employed as negative electrodes are often in the form of a porous compact or plaque with high surface area, thus increasing their reactivity. Consequently, lithium and lithium alloys are ordinarily handled in a dry and inert gas such as in a helium environment in the preparation of electrodes and in the assembly of electrochemical cells. Quite frequently, glove box type facilities are employed to provide this inert atmosphere and to insure the safety of employees.

Other difficulties have arisen as a result of swelling and distortion, particularly within the positive electrode. These distortions have caused current leakage and electrical shorts within the cell. Where iron sulfides are employed as the positive electrode reactant, it combines with lithium ions to form $Li_2S$ and iron metal with a volume increase of about 2.6 to 1 in the positive electrode. Sufficient void space will ordinarily be provided within the positive electrode to accommodate an expansion of this magnitude. However, experience in testing high-temperature cells of these types has shown nonuniform expansion of the positive electrode, possibly due to nonuniform current flow. The resulting distortion will produce electrical shorting even in cells having adequate space for the predicted expansion. In other instances, electrically conductive grids or mesh employed as current collectors have been distorted and interrupted, resulting in reduced effectiveness.

Therefore, in view of these problems associated with prior electrochemical cells, it is an object of the present invention to provide an electrochemical cell that can be easily assembled with a reduced likelihood of contamination.

It is also an object to provide an electrochemical cell with a positive electrode having a reduced risk of swelling or distortion.

It is a further object to provide an electrochemical cell with an improved uniformity in the distribution of reaction products within the positive electrode.

SUMMARY OF THE INVENTION

In accordance with the present invention a completely discharged, secondary electrochemical cell assembly is provided with a positive and a negative electrode along with an electrolyte including a lithium salt. The positive electrode includes one or more layers of metallic mesh or screen having an intimate mixture of an alkali metal sulfide such as lithium sulfide and the electrolyte embedded into the mesh. The mesh as thus impregnated, is held within a porous containment structure that is permeable to molten electrolyte. An electrode terminal penetrates the containment to make electrical contact with the mixture and the metallic mesh. In the negative electrode is a porous mass of aluminum metal impregnable by the electrolyte in molten state and an electrode terminal in electrical contact with the mass of aluminum. The terminals to both the positive and negative electrodes are electrically accessible from outside the cell housing for connection to an external electrical load or circuit. By passing an electrical current through the cell, a metal sulfide is produced in the positive electrode from reaction of the lithium sulfide and the metallic mesh while lithium-aluminum alloy is formed within the negative electrode.

BRIEF DESCRIPTION OF THE DRAWINGS

The present invention is illustrated in the accompanying drawings wherein:

FIG. 1 is an elevation view in cross section of a secondary electrochemical cell;

FIG. 2 is an enlarged view of an alternative positive electrode that can be employed within the electrochemical cell of FIG. 1;

FIG. 3 is an elevation view of an electrochemical cell employed to test the present invention;

FIGS. 5a, 5b, 5c, 5d and 5e are a series of related graphs showing a cell discharge voltage response under various conditions of high current load in the electrochemical cell of Example I.

FIGS. 6a, 6b, 6c, 6d and 6e are a series of related graphs showing various performance characteristics of the electrochemical cell of Example II.

DETAILED DESCRIPTION OF THE PREFERRED EMBODIMENT

Figure 4:
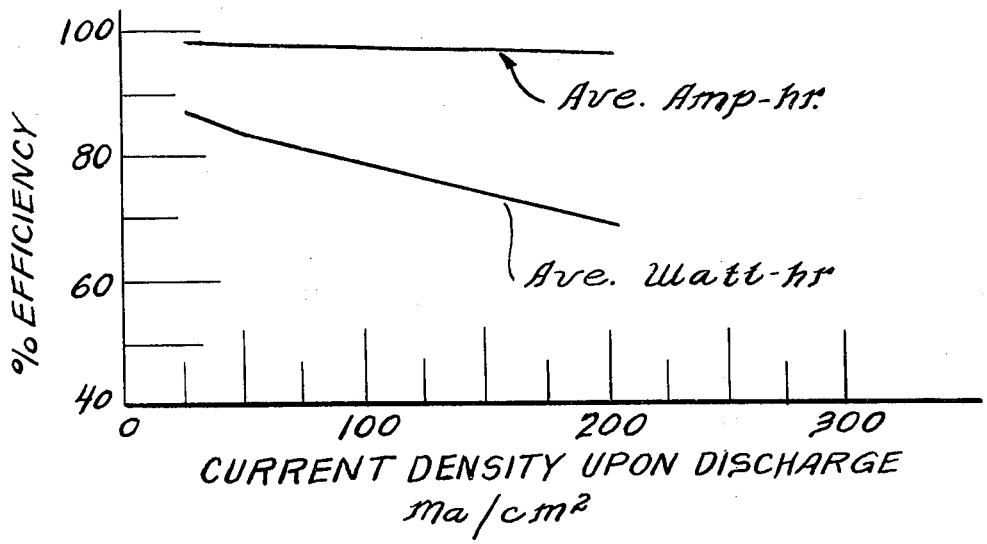
FIG. 4 is a graph showing electrochemical cell efficiency as a function of discharge current density of the electrochemical cell presented in Example I.

In FIG. 1 a sealed cell housing 11 contains two negative electrodes 13 and 15 in a stack with an intermediately disposed positive electrode 17. The upper negative electrode 13 and the lower negative electrode 15 are positioned in electrical contact with housing 11 at their edges and at the bottom surface of electrode 15. Electrode terminal 19 shown attached at the lower surface of housing 11 thereby permits external electrical connection to the negative electrodes. The upper negative electrode 13 is provided with a central opening for access of a second electrode terminal 21 into electrical contact with the centrally located positive electrode 17. Terminal 21 is surrounded with an electrically insulative collar 23 coextensive with electrode 13 thickness and somewhat into positive electrode 17. Electrode terminals 19 and 21 are shown as having complementary plug and socket connections to permit stacking of a plurality of electrochemical cells.

In addition, the positive and negative electrodes are electronically insulated by a ceramic fabric 25 which encloses electrode 7 and serves as an interelectrode separator. Fabric 25 is of an electrically insulating, porous material that is permeated and wetted by the cell electrolyte in molten state. As an example, separator fabric 25 may be a cloth orr perforated paper of boron nitride, zirconia or yttria. An outer porous layer or basket 26 of a corrosion-resistant material such as molybdenum or stainless steel screen can be included to further separate the electrodes and impart structural integrity. The electrolyte that fills porous regions of fabric 25 and the electrodes can be a lithium salt eutectic such as one of LiCl-KCl or LiCl-LiF-KBr. Various other suitable electrolytic salts can be selected from those listed in U.S. Pat. No. 3,488,221 cited above.

Negative electrodes 13 and 15 as assembled within the electrochemical cell and before electrical cycling are of porous metallic plaques of either a metal which will alloy with the negative electrode reactant, for example, aluminum or merely a nonreactive metal such as stainless steel. The metallic plaques can be a compact of fibers or wires, a metallic foam or an integral mass of sintered particles. Where porous aluminum plaques are employed, lithium-aluminum alloy is produced by electrochemically charging the cell.

Although not tried, it is reasonable to assume that a porous plaque of stainless steel or other nonreactive metal could be employed as the electrode structure illustrated at 13 and 15. On electrochemically charging the cell, elemental lithium metal could be expected to deposit within the stainless steel plaque, particularly if the cell is operated at 600°C. or over to enhance wetting. Alternatively, the interstitial surfaces within the porous plaque can be treated with an agent to reduce the surface tension of the molten lithium for operation at a lower temperature. As an example, a film of copper or copper alloy deposited onto the substrate surfaces may reduce the surface tension of liquid lithium sufficiently to cause wetting and impregnation of the porous plaque during electrocharging of the cell.

Positive electrode 17 disposed at the center of the cell comprises a single layer or a stack of several layers of a metallic mesh 27 as shown. Each of the mesh 27 are metallurgically bonded, forming electrical connection to terminal 21 and adjacent mesh with, for instance, a silver-copper alloy braze. The portion of terminal 21 penetrating into electrode 17 can comprise a stack of electrically conductive washers 18 of annular shape layered onto a central terminal pin between alternate layers of mesh. Suitable metallurgical bonds can be made between the washers and mesh.

The preferred metal for use in metallic mesh 27 is iron to permit formation of iron sulfides as the positive electrode reactant. Each layer of iron mesh is preferably of a low alloy concentration in order to minimize impurities within the electrochemical cell. For example, iron of about 99.9% purity can be used. However, additives that are less reactive than iron, such as molybdenum, tungsten or carbon and are electrically conductive materials, can be included if desired and may serve to enhance current collection after disintegration of the iron mesh.

Each layer of iron mesh will also have a sufficient proportion of open surface to permit press filling in powdered form of the remaining electrode materials. Iron mesh of 60 to 80% openings and 0.5 mm thickness have been found to be suitable in this application. For purposes of this application the term mesh shall include seives, screens, nets or any perforated layer of metal.

As assembled, electrode 17 also includes an intimate mixture of the cell electrolyte and the electrochemical cells' reaction product (lithium sulfide) embedded under pressure within the openings and interstices within the iron mesh stack. In one embodiment of the invention as illustrated in FIG. 1, the amount of lithium sulfide included within positive electrode 17 will be substantially less than the stoichiometric amount necessary to react with all of the iron to form FeS in accordance with the reaction

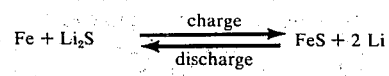

By including a substantial stoichiometric excess of iron within this electrode, sufficient iron mesh is expected to remain after the complete electrocharging of the cell to serve as a current collector within the positive electrode 17. At least a stoichiometric quantity of iron is provided in the mesh to enhance reactivity with the embedded $Li_2S$ while the excess iron is included either as additional mesh or as a structural member within the positive electrode containment.

Mesh of transition metals other than iron, such as cobalt, nickel or even molybdenum, can be employed in the positive electrode to form the corresponding sulfides as the electrode reactant. Typical reactions such as the reverse of those presented in the Background of the Invention are carried out during the electrochemical charging of the cell. The charging voltage of the cell is controlled at that required to form the desired metallic sulfides. As an example, charge voltages in respect to an Li-Al negative electrode are about 1.49 volts to form NiS, 1.74 to form $CoS_2$, 1.39 to form $Cu_2S$ and in excess of 2.7 to form $MoS_2$ as opposed to about 1.33 volts for FeS and 1.77 for $FeS_2$.

Of these materials molybdenum requires a much higher voltage for its oxidation than the other metals. For this reason, molybdenum can be included in the positive electrode either as a reactive materal or as an inert current collector material. The voltage set and controlled during the charging of the cell determines the role of a metal such as molybdenum.

In providing a mixture of lithium sulfide and an electrolyte for including within positive electrode 17, the materials are blended and ground together into a uniform and finely divided powder, for example of 5 to 30 microns diameter. The mixture can include as much as 60 to 90% $Li_2S$ by weight. The blended powders are heated to a temperature in excess of the melting point of the electrolyte (352°C. for LiCl-KCl eutectic). Repetitive grinding and heating to elevated temperatures produce a powdered mass of finely divided lithium sulfide particles coated and wetted with a layer of electrolyte. Electrode materials prepared in this manner can then be forced under pressure into the openings within a layer or a stack of iron mesh in order to form the compact of positive electrode 17. Typical pressing techniques will involve 200 to 700 kg/cm² for 10 to 30 minutes.

As an alternative, sufficient electrolyte can be blended with the lithium sulfide to form a paste-like mixture at temperatures above the melting point of the electrolyte. Such mixtures will include a low proportion of lithium sulfide, e.g. only about one third to one half the total by weight. The paste mixture can be pressed into the stack of iron mesh or, alternatively, merely applied as a paste layer intermediate and into mesh members.

After the positive electrode compact is completed, it is enclosed within a ceramic fabric and assembled along with the porous aluminum, negative electrodes within a cell housing such as that shown in FIG. 1. The cell is hermetically sealed by conventional metallurical techniques and connected to a source of direct current at the appropriate polarity to electrochemically form the cell reactants. Electrocharging with the above-mentioned cell materials will produce $FeS_2$ or FeS in the positive electrode and Li-Al alloy in the negative electrode.

Referring now to FIG. 2 where a more detailed view of a positive electrode is shown. The electrode includes a stack of several layers of mesh, some of which are of a reactive metal such as iron, nickel or cobalt while the others are of a more inert metal, having a higher oxidation potential, such as the refractory metals molybdenum, niobium, tungsten and their alloys. As illustrated, two sets of four layers each of reactive metal mesh 31 and 31' are interposed among three spaced layers of inert, refractory metal mesh 33. The layers of inert metal mesh 33 are of somewhat greater thickness than those of reactive metal mesh 31. The increased thickness provides adequate cross section for current collection even if some chemical or electrochemical corrosion occurs. The reactive metal mesh is of lesser thickness to provide greater contact area per unit mass with the $Li_2S$-electrolyte mixture 32.

Each of the inert metal layers is shown having a centrally disposed washer 35 that is metallurgically bonded to the central electrode terminal 37. Washers similar to those illustrated at 35 can also be supplied on each of the reactive metal layers 31 to add to structural integrity. However, since most of the iron mesh will enter the cell reaction, this is of lesser importance.

The stack of inert metal and iron mesh are impregnated with an intimate mixture of lithium sulfide and electrolyte as was discussed in conjunction with FIG. 1. The positive electrode compact thus formed is enclosed within a ceramic fabric 39 of such as zirconium oxide, boron nitride or yetrium oxide and a basket 41 of a material such as molybdenum or stainless steel.

The use of an inert metal as a current collector material has particular application in the design of positive electrodes in which $FeS_2$ is the intended reactant. Excess iron within the positive electrode reacts spontaneously with $FeS_2$ to form FeS. Therefore, if the amount of iron included within the positive electrode, that is within the confines of ceramic insulator fabric 39 in electrical contact or capable of migrating into electrical contact with the positive electrode terminal 37, is less than the stoichiometric amount required to combine with all of the $Li_2S$ present to form FeS, and if the charge voltage is above 1.77 volts, then $FeS_2$ can be formed in accordance with the equation:

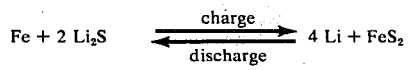

In order to avoid the formation of elemental sulfur (2.1 volts vs. Li-Al) within the cell, at least enough iron is included to stoichiometrically balance the $Li_2S$ in the electrode with formation of $FeS_2$. Therefore, in positive electrodes in which the reactant is to be $FeS_2$ or a combination of $FeS_2$ and FeS, the amount of elemental iron included within the layers of mesh 31 or in other forms within the positive electrode will be in a 1:1 to 1:2 mole ratio to the amount of $Li_2S$ present. In cells in which the electrode reactant is to be only FeS, substantial excess of iron can be included to ensure complete reaction and to serve as current collector material. This is of considerable benefit due to the relative lower cost of iron in respect to the various inert metals that are suitable for current collection.

In employing nickel and cobalt sulfides as the positive electrode reactant, the same principles governing the ratio of the metal to $Li_2S$ hold. For example, large stoichiometric excess of cobalt metal is only possible if the electrode reactant is to be CoS. Where $Co_3S_4$, $Co_2S_3$ or $CoS_2$ are to be electrochemically produced within the positive electrode, more precise stoichiometric amounts of cobalt are included along with an inert metal or current collection.

The term inert metal as used in this application shall be interpreted to mean a metal which is characterized by a substantially higher oxidation potential (vs. a common negative electrode reactant) than that of the reactive metal selected for use. Consequently, the inert metal will not electrochemically react with $Li_2S$ during the charging of the cell if the charging voltage is controlled close to that required to produce the desired positive electrode reactant.

Table I below lists oxidation potentials for several potential reactive and current collector materials in the absence of $Li_2S$. The reaction of $Li_2S$ and the metal occurs generally at a voltage of 0.2 to 0.5 volts less than that of the listed oxidation potentials.

In FIG. 3 another electrochemical cell configuration is illustrated that has been used in experimentally evaluating various electrodes. The cell includes a metallic housing 51 containing a positive electrode 47 supported above and spaced from a negative electrode 49 within a pool of molten electrolyte 55. An electrically insulative cylinder 59 of, for instance, beryllium oxide is interposed between the positive electrode 47 and the housing walls to prevent current leakage carried by electrolyte impurities. The negative electrode is disposed in electrical contact with the cell housing which is employed as the negative terminal.

The positive electrode 47 illustrated is essentially that employed in the electrochemical cell of Example II. It is contained within a stainless steel ring 46 with top and bottom screens 50. A ceramic fabric 52 covers the upper and lower surfaces of a compact 54 having the $Li_2S$-electrolyte mixture embedded into metallic mesh 57. Electrical contact to the positive electrode is made through terminal 53 by means of an attached perforated plate 56 between the top layer of fabric 52 and the upper surface of compact 54. Plate 56 is suitably bonded to ring 46 to support and to provide electrical contact to the positive electrode compact at its upper surface and at its peripheral edges.

TABLE I

Oxidation Potentials of Metals vs. $Li^a$ in LiCl-KCl at 400–450°C.

|  | Observed V | Theoretical V | Probable Reaction |
|---|---|---|---|
| Stainless Steels, Fe | 2.15 | 2.13 | Fe(0) - Fe(II) |
| Solid Co | 2.25 | 2.31 | Co(0) - Co(II) |
| Cu Felt | 2.28 | 2.35 | Cu(0) - Cu(I) |
| Nb Mesh | 2.50 | — | Nb(0) - Nb(IV) |
| Mo Foam | 2.70 | 2.70 | Mo(0) - Mo(III) |
| Mo-W Alloy | 2.73 | 2.70 | Mo(0) - Mo(III) |
| W Mesh | 3.0 | 3.66 | $Cl^-$ - $Cl_2$ |
| Solid W | 3.70 | 3.66 | $Cl^-$ - $Cl_2$ |

$^a$Oxidation potentials vs. Li-Al alloy are approximately 0.3 volts less than those shown.

It can be seen from Table I that the refractory metals niobium, molybdenum, and tungsten are particularly well suited for use as inert current collector materials in cells employing a limited stoichiometric proportion of iron for the production of $FeS_2$. Other suitable inert and reactive metal combinations can likewise be selected from Table I as well as from other published data on oxidation potentials.

The following examples are presented based on the operation of cells having a general configuration similar to that illustrated in FIG. 3. Various specific characteristics of these cells described in these examples are set forth in Table II.

TABLE II

| Example | I | II | III |
|---|---|---|---|
| Cell | Y-2 | Y-3 | Y-4 |
| Positive Electrode | | | |
| $Li_2S$, gm | 7.5 | 2.6 | 10.8 |
| gm-moles | 0.16 | 0.057 | 0.235 |
| Fe, gm | 8.2 |  | 18.7 |
| gm-moles | 0.15 | * | 0.335 |
| Mesh Layers, Fe | 8 | 1 | 4 (loaded) |
| Mo | 3 | 0 | 0 |
| Electrolyte (LiCl-KCl), gm | 15 | 1.3 | 7.2 |
| Area, cm$^2$ | 20 | 20 | 20 |
| Active Volume, cm$^3$ | 20 | 2.9 | 12.6 |
| Electrode reactant | FeS + Fe$_2$S | FeS | FeS |
| Theoretical capacity | | | |
| Amp hrs. | 7.87 | 2.98 | 12.6 |
| Negative Electrode | | | |
| Al, gm | 25.4 | 25 | 25 |
| Area, cm$^2$ | 35 | 42 | 42 |
| Volume, cm$^3$ | 22 | 17 | 17 |
| Electrode separation, cm | 1.0 | 0.5 | 0.5 |
| Operating temperature, °C. | 400–430 | 400–450 | 420 |

*Positive electrode current collection and terminal was in the form of a stainless steel ring at the electrode periphery which provided substantial excess of iron to that required for FeS formation.

EXAMPLE I

An experimental electrochemical cell was assembled in a completely discharged condition. The negative electrode disposed at the bottom of the cell was a disk of compacted aluminum fibers covered with a stainless steel screen. The positive electrode was substantially the same as that illustrated in FIG. 2 containing three layers of molybdenum mesh and eight layers of iron mesh. A mixture of powdered $Li_2S$ and molten LiCl-KCl in a weight ratio of two parts electrolyte to one part $Li_2S$ was prepared and applied as a paste in between and into the openings of each layer of iron mesh. Substantially uniform amounts of paste were applied to and throughout the area of each mesh layer. As each layer was assembled onto the central electrical terminal, it was brazed thereto with a copper-silver alloy brazing material. The amount of iron included within the mesh was sufficent to combine with all the lithium sulfide to form $FeS_2$ but insufficient to combine with all of the sulfur as FeS with excess iron.

The cell was operated over 166 discharge/charge cycles and 1433 hours. The positive electrode capacity remained stable even at as much as 6.5 amp-hours capacity and one amp current. One aspect of the cell performance is presented in FIG. 4 where the average amp-hour and watt-hour efficiencies are shown for cycles 147 to 165 at various current densities.

Figure 5A:
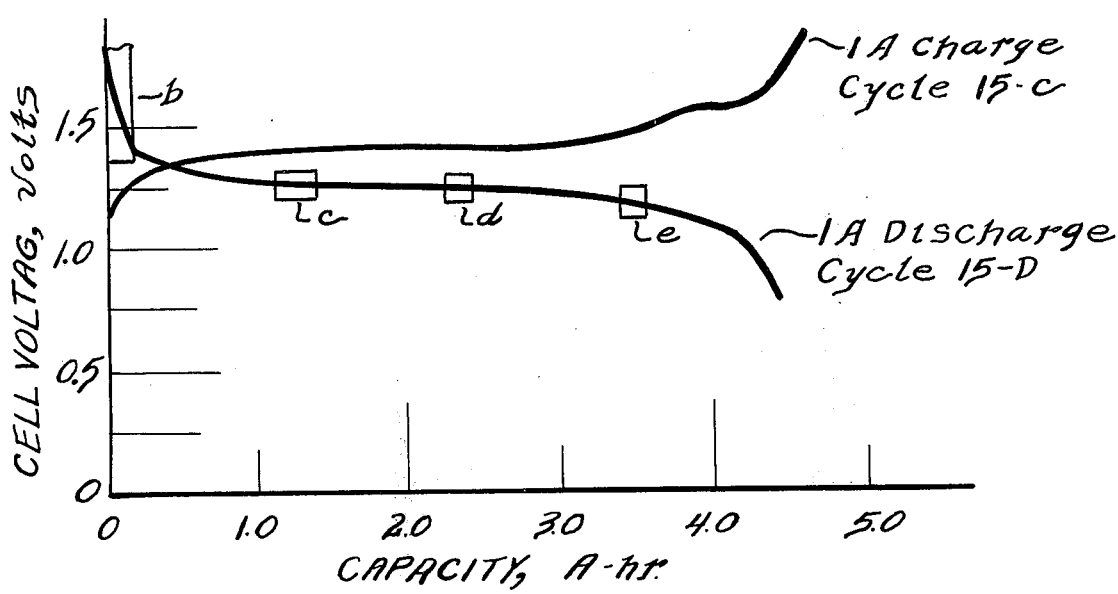

A plot of cell discharge and charge voltage versus capacity at one amp in an early formation cycle is shown in FIG. 5a. The discharge voltage typifies an FeS electrode in respect to a lithium-aluminum electrode, with a small additional capacity contributed by $FeS_2$. FIGS. 5b through 5e show the voltage of various currents taken over a 15 second interval and at various states of discharge. The small rectangles shown in FIG. 5a corresponds to these various states of discharge. Currents of 6, 10, 16 and 27 amps were superimposed for these short durations on the 1-amp continuous discharge shown in FIG. 5a.

The physical shape and size of the positive electrode was examined several times during the cell operation and at its termination. No noticeable geometric distortion or volume change was detected by the visual examination.

EXAMPLE II

An electrochemical cell substantially as shown in FIG. 3 was assembled and tested. In preparing the active materials within the positive electrode, two parts of $Li_2S$ were mixed with one part LiCl-KCl eutectic salt by weight. The dry mix was ground to pass a 70-mesh U. S. standard screen and heated to 425°C. in a vitreous carbon crucible to melt the electrolytic salt. After cooling, this procedure was repeated and the final material also ground to pass a 70-mesh screen.

The resulting mixture of substantially uniform $Li_2S$-electrolyte composition was weighed to stoichiometrically match a 5-cm diameter, 14-mesh iron mesh based on conversion of $Li_2S$ to FeS. Excess iron for current collection was provided by the electrode structure and electrode terminal which were of stainless steel. The powdered mixture was hot-pressed into the iron mesh at 300°C., 15 ton (680 kg/cm²) pressure and 30 minutes total pressing time. Inspection revealed a compact of uniform thickness and distribution of the electrode materials. The resulting electrode compact was 7.2 grams, 1.45 mm thick, and 94% of theoretical density.

The theoretical capacity loading was 1.02 amp-hours per cm³.

The charging characteristics of the cell were similar to those of cell Y-2 in that the charge voltage rose to a plateau of about 1.6 to 1.7 volts (IR free). This is consistent with the theory that the reaction at the positive electrode is Fe yields $Fe^{2+} + 2e^-$. The iron ion (probably as $FeCl_4^{2-}$) then migrates to the $Li_2S$ and reacts $Fe^{2+} + Li_2S$ yields $FeS + 2 Li^+$.

Figure 6C:
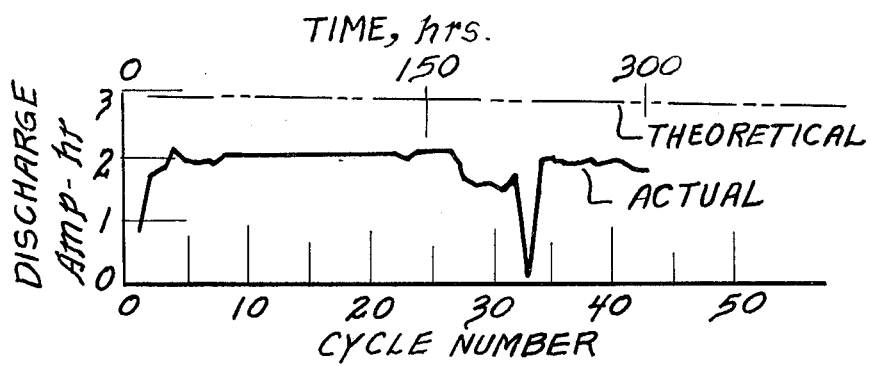
Figure 6D:
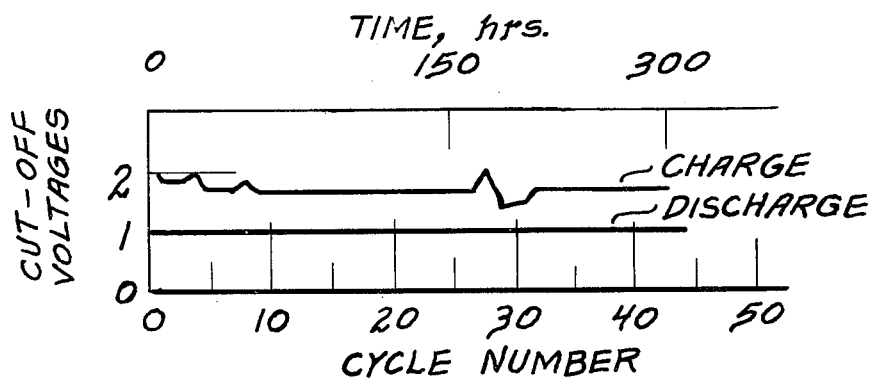
Figure 6E:
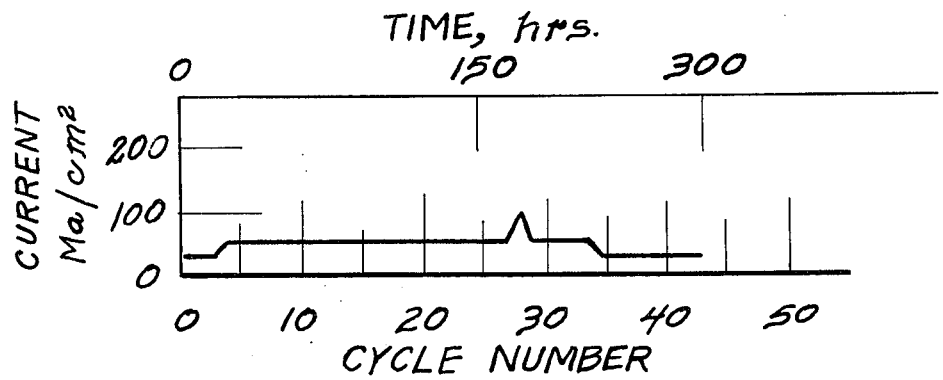

The cell was operated for 43 cycles and 300 hours until it was voluntarily terminated. A temporary electrical short at about 200 hours was caused by a direct physical contact between the two electrodes and was cleared up by physical separation. During the operation the cell consistently performed at capacity densities of 0.7 amp-hour per cm³ at 50 milliamps per cm² current density based on the active compact volume. Inspection of the positive electrode after cycling showed minimal distortion. Other results of the cell operation are presented in FIGS. 6a through 6e. The amp-hour and watt-hour efficiencies of FIG. 6a are based on discharge to charge proportions.

EXAMPLE III

An electrochemical cell similar to that of Example II was tested with a positive electrode having a stack of four compacts of electrode materials embedded into iron mesh. Each compact included approximately equal stoichiometric amounts of iron and $Li_2S$ to form FeS. Excess iron was provided with two additional layers of iron mesh at the top and bottom of the stack. A clamp-type electrical contact was metallurgically bonded to each layer of mesh.

This cell was operated for over 1000 hours and 60 cycles until it was voluntarily terminated. Typical sulfur utilization of 70% at 98% amp-hour efficiency and 75% watt-hour efficiency (based on the amount of watt-hour discharged and charged) were attained at 50 mA/cm² current density. A discharge capacity of 6 to 8 amp-hours was maintained throughout most of the test. Other operating characteristics were basically similar to those given with Example II, demonstrating that a plurality of positive electrode compacts can be combined in a stack to provide additional amp-hour capacity.

It will be seen from the above examples and discussions, that a high-temperature and high-specific-energy electrochemical cell can be assembled in a completely discharged state. This eliminates the need for handling highly reactive electrode materials in cell assembly. Therefore, reduced contamination of the electrode reactants and improved safety are achieved. Although the invention is described in detail in respect to the examples and the individual drawings, it will be clear that modifications in materials and structure can be made by those skilled in the art within the scope of the invention as defined in the appended claims.

The embodiments of the invention in which an exclusive property or privilege is claimed are defined as follows:

1. A completely discharged, secondary electrochemical cell assembly having a cell housing, a positive and a negative electrode disposed within said housing, a molten electrolyte including a lithium salt intermediate said positive and negative electrodes, said cell as assembled comprising:

in said positive electrode, a porous containment structure penetrable by said electrolyte in molten state, a metallic mesh comprising a metal selected from the group consisting of Fe, Co, Ni, Cu and Mo disposed in said containment structure, an intimate mixture consisting essentially of solid, particulate $Li_2S$ and said molten electrolyte embedded into said metallic mesh in uniform quantities throughout said mesh, and a positive electrode terminal in electrical contact with said mixture and said metallic mesh; and in said negative electrode, a porous solid mass consisting essentially of aluminum metal, impregnable by said electrolyte in molten state, and a negative electrode terminal in electrical contact with said porous mass of aluminum, said negative and said positive electrode terminals being electrically accessible from outside said cell housing for connection of a source of electrical potential to electrochemically form a metallic sulfide of a metal selected from the group consisting of Fe, Co, Ni, Cu and Mo within said positive electrode and lithium-aluminum alloy within said negative electrode.

2. The electrochemical cell of claim 1 wherein a plurality of said metallic mesh embedded with said mixture are disposed in layers within said positive electrode.

3. The electrochemical cell of claim 1 wherein said metallic mesh comprises a transition metal selected from the group consisting of iron, cobalt and nickel.

4. The electrochemical cell of claim 3 wherein said transition metal is iron included in stoichiometric ratio in respect to said $Li_2S$ sufficient to form $FeS_2$ without excess $Li_2S$ but insufficient to form FeS with excess iron and wherein there is included within said containment structure of said positive electrode a mesh of an inert metal having an oxidation potential versus lithium substantially higher than that of iron.

5. The electrochemical cell of claim 4 wherein said inert metal is selected from the group consisting of molybdenum, tungsten and alloys of molybdenum and tungsten.

6. The electrochemical cell of claim 3 wherein said transition metal is iron included in substantial stoichimetric excess in respect to $Li_2S$ of that required to form FeS, said excess iron being retained in said positive electrode as current collector material.

7. The electrochemical cell of claim 1 wherein said intimate mixture of $Li_2S$ and said electrolyte comprises particles of $Li_2S$ coated with fused electrolyte in a composition by weight of about 60 to 90% $Li_2S$.

8. The electrochemical cell of claim 7 wherein said coated particles are of about 5 microns to 30 microns in size and are in compacted engagement with adjacent particles and with said metallic mesh.

9. A method of preparing an electrochemical cell having a positive electrode with iron sulfide as a reactant, a negative electrode with lithium, in the form of lithium-aluminum alloy, as a reactant, and an electrolyte including a lithium salt intermediate said positive and negative electrodes, the improved method comprising admixing particulate lithium sulfide and said electrolyte to form a uniform and intimate mixture; pressing said intimate mixture into interstices within a metallic mesh of a metal comprising Fe to form a positive electrode compact that is substantially free of iron sulfides; enclosing said compact within a containment structure including an electrical terminal in electrical contact with said compact; sealing said positive electrode compact within said cell housing along with said electrolyte and a negative electrode structure consisting essentially of a porous aluminum mass; and electrochemically charging said sealed cell to form iron sulfide within said positive electrode and lithium-aluminum alloy within said negative electrode.

10. The method according to claim 9 wherein said intimate mixture of lithium sulfide and electrolyte is formed by contacting said particulate $Li_2S$ with molten electrolyte to produce $Li_2S$ particles having a coating of fused electrolyte.

11. The method of claim 10 wherein said intimate mixture of lithium sulfide and electrolyte is repetitively ground and heated to a temperature in excess of the melting point of said electrolyte to form lithium sulfide particles coated with electrolyte of sizes between 5 microns and 30 microns.

12. The method of claim 9 wherein said intimate mixture of lithium sulfide and electrolyte is pressed into a plurality of stacked metallic mesh at a pressure of about 200 to 700 kg/cm² for an interval of about 10 to 30 minutes.

* * * * *